United States Patent
Devroe et al.

(10) Patent No.: US 11,547,058 B2
(45) Date of Patent: Jan. 10, 2023

(54) AGRICULTURAL BALER

(71) Applicant: CNH Industrial America LLC, New Holland, PA (US)

(72) Inventors: Jeroen Devroe, Izegem (BE); Dieter Kindt, Vladslo (BE); Dries Liefooghe, Alveringem (BE); Bram Rosseel, Snellegem (BE)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 16/369,900

(22) Filed: Mar. 29, 2019

(65) Prior Publication Data
US 2019/0297780 A1     Oct. 3, 2019

(30) Foreign Application Priority Data

Mar. 29, 2018 (BE) .................................. 2018/5215

(51) Int. Cl.
*A01F 15/10*     (2006.01)
*A01F 17/02*     (2006.01)

(52) U.S. Cl.
CPC ............ *A01F 15/101* (2013.01); *A01F 17/02* (2013.01); *A01F 2015/102* (2013.01); *A01F 2015/107* (2013.01)

(58) Field of Classification Search
CPC .. A01F 15/10; A01F 15/101; A01F 2015/102; A01F 15/106; A01F 2015/107; A01F 2015/105; A01F 17/02
See application file for complete search history.

(56) References Cited

U.S. PATENT DOCUMENTS

| 4,275,550 | A | 6/1981 | Swenson et al. |
| 7,404,284 | B2 | 7/2008 | Viaud et al. |
| 2016/0219789 | A1* | 8/2016 | Derscheid et al. .. A01D 89/001 |

FOREIGN PATENT DOCUMENTS

| EP | 74533 A1 | 3/1983 | |
| EP | 0339733 A1 * | 11/1989 | ........... A01F 15/101 |
| EP | 0339733 A1 | 11/1989 | |

(Continued)

OTHER PUBLICATIONS

Extended European Search Report for EP Application 19163868.3 dated May 21, 2019 (7 pages).

*Primary Examiner* — Jimmy T Nguyen
(74) *Attorney, Agent, or Firm* — Peter Zacharias; Patrick Sheldrake (57) ABSTRACT

An agricultural baler includes a feeder duct communicating with a bale chamber for charges of crop material to be transferred into a bale chamber. The baler also includes a door that defines at least a portion of a bottom wall of the feeder duct. The door is movable between: (i) a door-open-position, in which an opening in the bottom wall is provided; and (ii) a door-closed-position in which the opening is closed. The baler further includes a pick-up device that is movable between: (i) a lowered-position in which it is operable to convey crop material into the feeder duct; and (ii) a raised-position in which it is spaced further away from the ground than in the lowered-position. The pick-up device is mechanically coupled to the door of the bottom wall such that movement of the pick-up device causes the door to move from the door-open-position to the door-closed-position.

16 Claims, 11 Drawing Sheets

(56) References Cited

FOREIGN PATENT DOCUMENTS

| EP | 1062860 | A2 | * | 12/2000 | ............ | A01F 15/10 |
|----|---------|----|---|---------|--------------|------------|
| EP | 1062860 | A2 |   | 12/2000 |              |            |
| EP | 2779819 | B1 |   | 5/2016  |              |            |
| WO | 2017/068058 | A1 |   | 4/2017 |              |            |
| WO | 2017/068060 | A1 |   | 4/2017 |              |            |

* cited by examiner

AGRICULTURAL BALER

This application claims priority to Belgium Patent Application No. BE2018/5215, filed Mar. 29, 2018, which is incorporated in its entirety herein by reference.

BACKGROUND OF THE INVENTION

The present invention relates to agricultural balers, and more specifically to rectangular balers, that is, balers that produce bales of crop material that are rectangular in side view, and to a method relating to the operation of such a baler.

SUMMARY OF THE INVENTION

According to a first aspect of the invention, there is provided an agricultural baler, comprising:

a bale chamber having a bottom wall in which an inlet opening is formed;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct;

a door that defines at least a portion of the bottom wall of the feeder duct, wherein the door is movable between: (i) a door-open-position, in which an opening in the bottom wall is provided; and (ii) a door-closed-position in which the opening is closed;

an actuator that is configured to move an operational component of the baler between: (i) a first-position; and (ii) a second-position, wherein the operational component of the baler is not the door;

wherein:
the actuator is mechanically coupled to the door of the bottom wall such that movement of the operational component between the first-position and the second-position causes the door to move from the door-open-position to the door-closed-position.

Providing a mechanical coupling between the actuator and the door can provide an advantageous way of closing the door. For example, fewer people may be required to remove a blockage from the feeder duct and then reconfigure the baler to continue baling, and/or a baling operation can be performed more quickly.

The actuator may be a pick-up-actuator. The operational component may be a pick-up device that is movable between: (i) a lowered-position in which it is adjacent the ground and is operable to convey crop material into the lower end of the feeder duct; and (ii) a raised-position in which it is spaced further away from the ground than in the lowered-position. The pick-up device may be mechanically coupled to the door of the bottom wall such that movement of the pick-up device between the lowered-position and the raised-position causes the door to move from the door-open-position to the door-closed-position.

The actuator may be a bottom-drawer-movement-actuator. The operational component may be a bottom-drawer that is movable between: (i) a drawer-closed-position, in which a bottom-drawer-edge is adjacent to a door-edge when the door is in the door-closed-position; and (ii) a drawer-open-position, in which the bottom-drawer-edge is spaced apart from the door-edge when the door is in the door-closed-position. The bottom-drawer-movement-actuator may be mechanically coupled to the door of the bottom wall such that movement of the bottom-drawer-movement-actuator between the drawer-closed-position and the drawer-open-position causes the door to move from the door-open-position to the door-closed-position.

The actuator may be a knife-movement-actuator. The operational component may be one or more knives that are movable between: (i) a knives-exposed-position, in which the one or more knives are suitably aligned with another component of a cutting unit such that crop material is cut by the knives when it enters the feeder duct; and (ii) a knives-retracted-position, in which the one or more knives are spaced apart from the other component of the cutting unit such that crop material is not cut by the knives when it enters the feeder duct. The knife-movement-actuator may be mechanically coupled to the door of the bottom wall such that movement of the knife-movement-actuator between the knives-exposed-position and the knives-retracted-position causes the door to move from the door-open-position to the door-closed-position.

The actuator may comprise a hydraulic actuator or an electrical actuator.

The door may comprise a latch mechanism for retaining the door in the door-closed-position. The latch mechanism may be automatically lockable to retain the door in the door-closed-position when it is moved from the door-open-position to the door-closed-position. The latch mechanism may be manually releasable to permit movement of the door from the door-closed-position to the door-open-position.

The pick-up device may be mechanically coupled to the door of the bottom wall by a linkage mechanism. The pick-up device may be mechanically coupled to the door of the bottom wall by a linkage cable.

The door may be rotatable about a door-pivot-axis such that it is movable between the door-closed-position and the door-open-position.

The pick-up device may be rotatable about a pick-up-pivot-axis such that it is movable between the lowered-position and the raised-position.

The door of the bottom wall of the feeder duct may comprise a door-edge. The baler may further comprise a bottom drawer that defines a portion of the bottom wall of the feeder duct. The bottom drawer may comprise a bottom-drawer-edge. The bottom drawer may be movable between (i) a drawer-closed-position, in which the bottom-drawer-edge is adjacent to the door-edge when the door is in the door-closed-position, and (ii) a drawer-open-position, in which the bottom-drawer-edge is spaced apart from the door-edge when the door is in the door-closed-position.

The bottom drawer may be rotatable about a bottom-drawer-pivot-axis such that it is movable between the drawer-closed-position and the drawer-open-position.

The bottom drawer may be a cutting drawer.

The bottom drawer may extend along at least 20%, 30%, or 40% of the length of the bottom wall.

The door may extend along less than 80%, 70% or 60% of the length of the bottom wall.

There may be provided a method of accessing a feeder duct of an agricultural baler, the baler comprising:

a bale chamber having a bottom wall in which an inlet opening is formed;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct;

a door that defines at least a portion of the bottom wall of the feeder duct, wherein the door is movable between: (i) a door-open-position, in which an opening in the bottom wall is provided; and (ii) a door-closed-position in which the opening is closed;

a pick-up device that is movable between: (i) a lowered-position in which it is adjacent the ground and is operable to convey crop material into the lower end of the feeder duct; and (ii) a raised-position in which it is spaced further away from the ground than in the lowered-position;

wherein the pick-up device is mechanically coupled to the door of the bottom wall such that movement of the pick-up device between the lowered-position and the raised-position causes the door to move from the door-open-position to the door-closed-position, the method comprising:

moving the door from the door-closed-position to the door-open-position; and moving the pick-up device between the lowered-position and the raised-position in order to cause the door to move from the door-open-position to the door-closed-position.

In this way, the door can move together with the pick-up device when it moves from the door-open-position to the door-closed-position.

The method may further comprise one or more of the following steps:

removing any plug of crop material from the feeder duct, before moving the pick-up device between the lowered-position and the raised-position;

releasing a latch before moving the door from the door-closed-position to the door-open-position;

moving a bottom drawer from a drawer-closed-position to a drawer-open-position; and moving the bottom drawer from the drawer-open-position to the drawer-closed-position.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1:
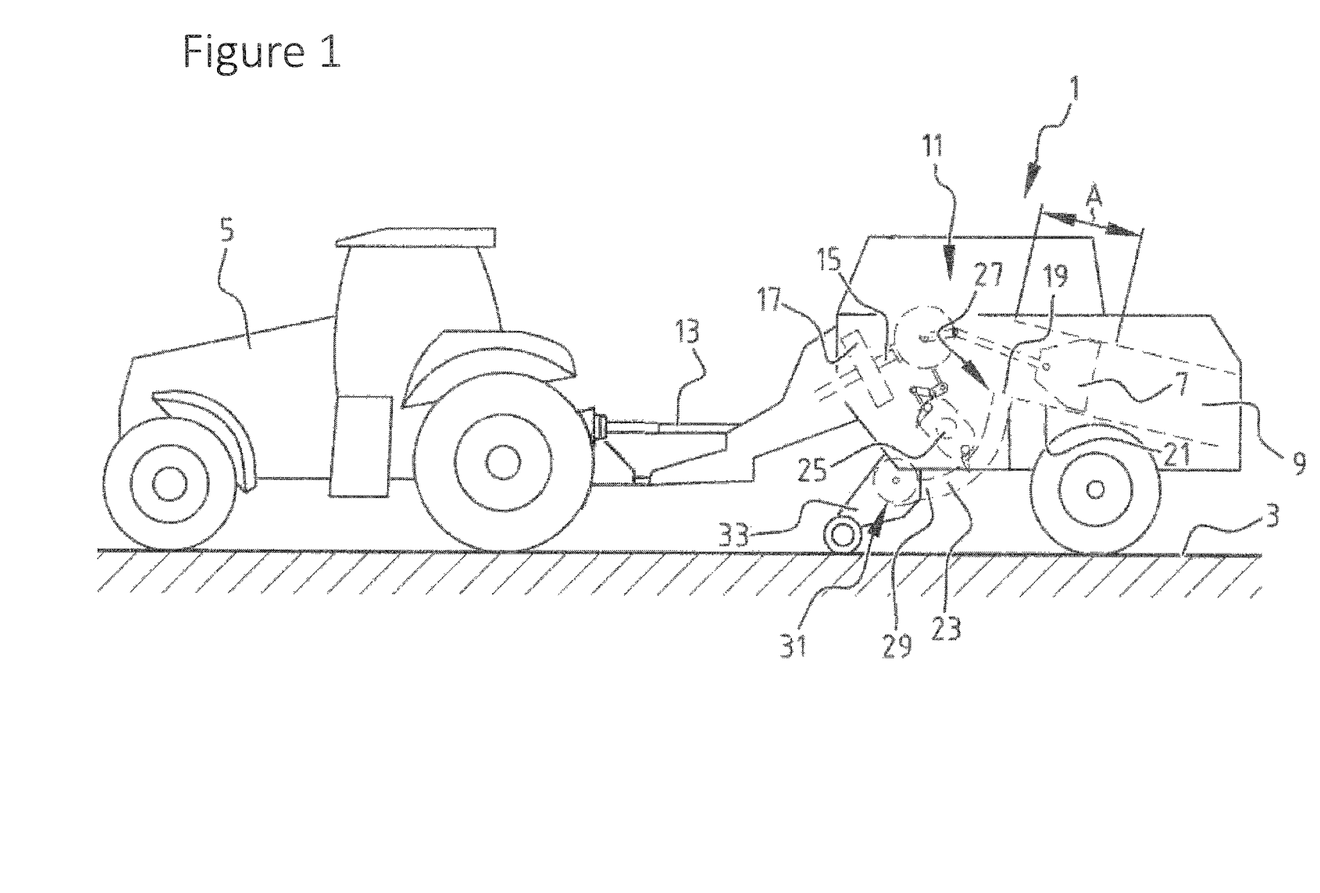
FIG. 1 shows a rectangular agricultural baler.

FIG. 1 shows a rectangular agricultural baler 1. The baler 1 can be moved forward over a ground surface 3 by means of a tractor 5. The baler 1 is provided with a plunger 7 that during operation is moved reciprocally along a linear path A in a bale chamber 9 by means of a crank mechanism 11 connected to the plunger 7. The crank mechanism 11 is connected for driving via a drive shaft 13 to the motor of the tractor 5. The tractor 5 is provided for this purpose with a power take-off device, also referred to as PTO. The drive shaft 13 connects an output shaft of the PTO of the tractor 5 to an input shaft 15 of the crank mechanism 11. A flywheel 17 is arranged on the input shaft of the crank mechanism.

The bale chamber 9 has an inlet opening 19 formed in the bottom wall 21 thereof. A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 can also be referred to as a pre-compression chamber (PCC) because it defines a volume in which the crop material is compressed before being moved into the bale chamber 9.

The feeder duct 23 has an upper end 27 facing generally upwardly and communicating with the inlet opening 19 in the bale chamber 9, and a lower end 29 facing generally in a forward direction and communicating with a cutting unit 31. The cutting unit 31 is arranged for cutting crop material supplied by a pick-up device 33 and to convey the cut crop material into the feeder duct 23.

Figure 2:
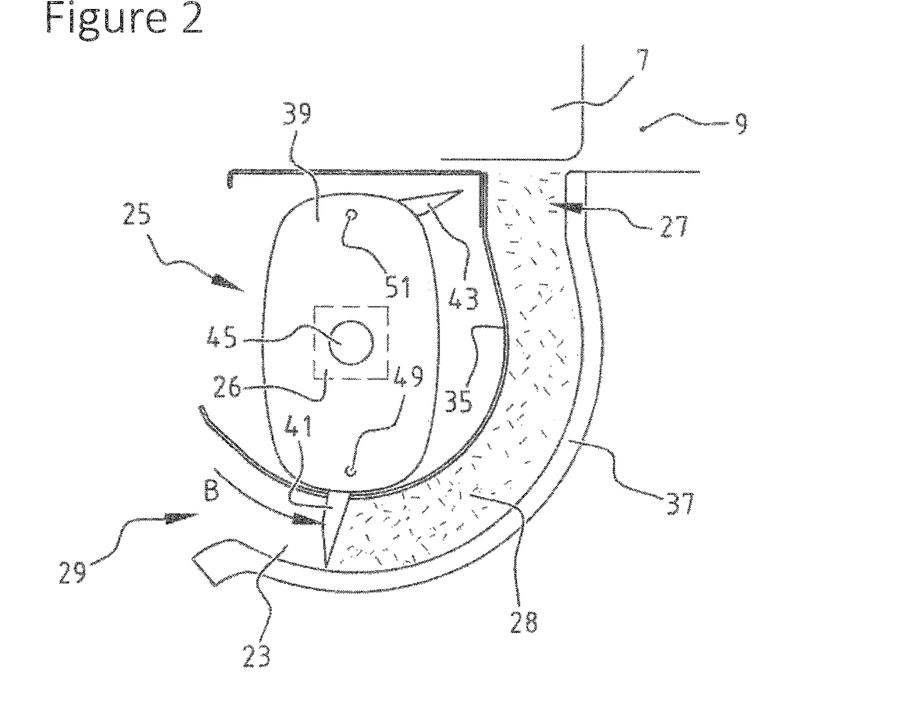
FIGS. 2 and 3 show the feeder duct during normal operation, in more detail.
Figure 3:
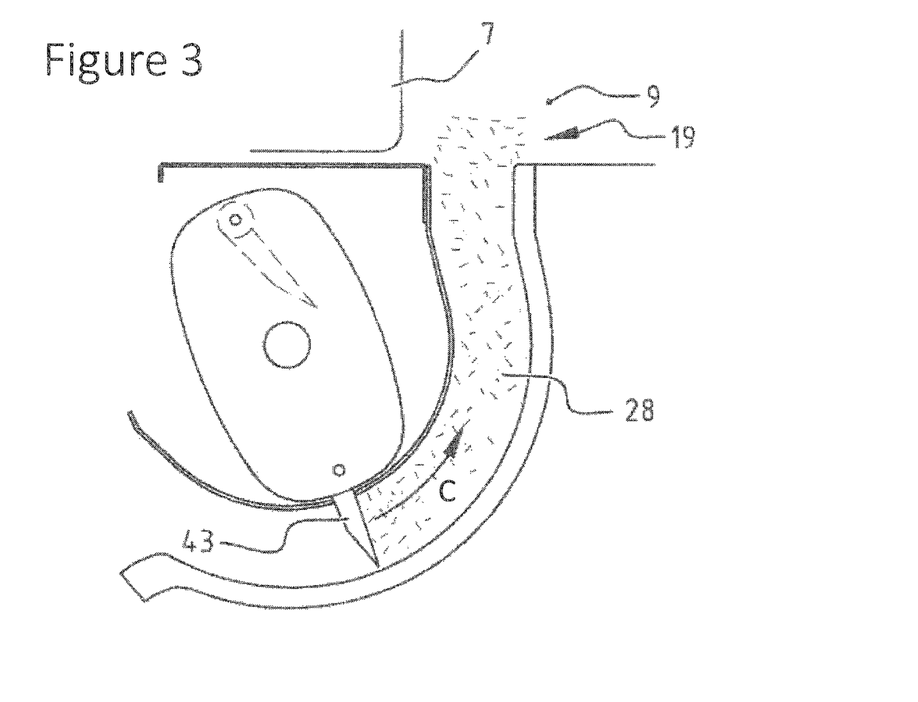

FIGS. 2 and 3 show the feeder duct 23 during normal operation, in more detail. The feeder duct 23 is defined between a feeder duct top wall 35 and feeder duct bottom wall 37. The feeder duct top wall 35 provides an upper boundary for the feeder duct 23. The feeder duct bottom wall 37 provides a lower boundary for the feeder duct 23. Feeder means 25 are operable in the feeder duct 23. The feeder means 25 include a rotatable drum 39 having sets of tines 41, 43 arranged thereon. In operation, the drum 39 is rotated in the direction of arrow B about an axis of rotation 45.

The feeder means 25 further include a schematically shown drive 26. The drive 26 is arranged for rotating the drum 39 in the direction of arrow B about axis of rotation 45. The drive 26 further includes a mechanism for rotating the respective sets of tines 41, 43 relative to the drum 39 about a respective axis of rotation 49, 51, while the drum 39 is rotated in the direction of arrow B about its axis of rotation 45. This causes the outer ends of the tines 41, 43 to be moved along a path of movement. This path of movement may be a fixed path of movement or an adjustable path of movement, wherein the drive 26 comprises a mechanism for adjusting the path of movement of the sets of tines 41, 43, while the drum 39 is rotated in the direction of arrow B about axis of rotation 45.

During normal operation, the outer ends of the tines 41, 43 are caused to be moved along a path of movement through the feeder duct 23 in the direction indicated by arrow C, thereby conveying cut crop material that has been conveyed by the cutting unit 31 (shown in FIG. 1) into the lower end 29 of the feeder duct 23, from the lower end 29 of the feeder duct 23 toward the upper end 27 thereof.

As illustrated by means of FIG. 2, the feeder means 25 first accumulate a charge of crop material 28 in the feeder duct 23.

As illustrated by means of FIG. 3, once the charge of crop material 28 has been accumulated, and the plunger 7 has cleared the inlet opening 19 of the bale chamber 9, the outer ends of the tines 43 are caused to be moved along a path of movement through the feeder duct 23 in the direction indicated by arrow C, thereby stuffing, i.e. conveying, the accumulated charge of crop material 28 through the opening 19 into the bale chamber 9.

It will be appreciated that different mechanisms can be used for accumulating the charge of crop material 28 in the feeder duct 23, and for stuffing/conveying, the accumulated charge of crop material 28 through the opening 19 into the bale chamber 9.

Figure 4:
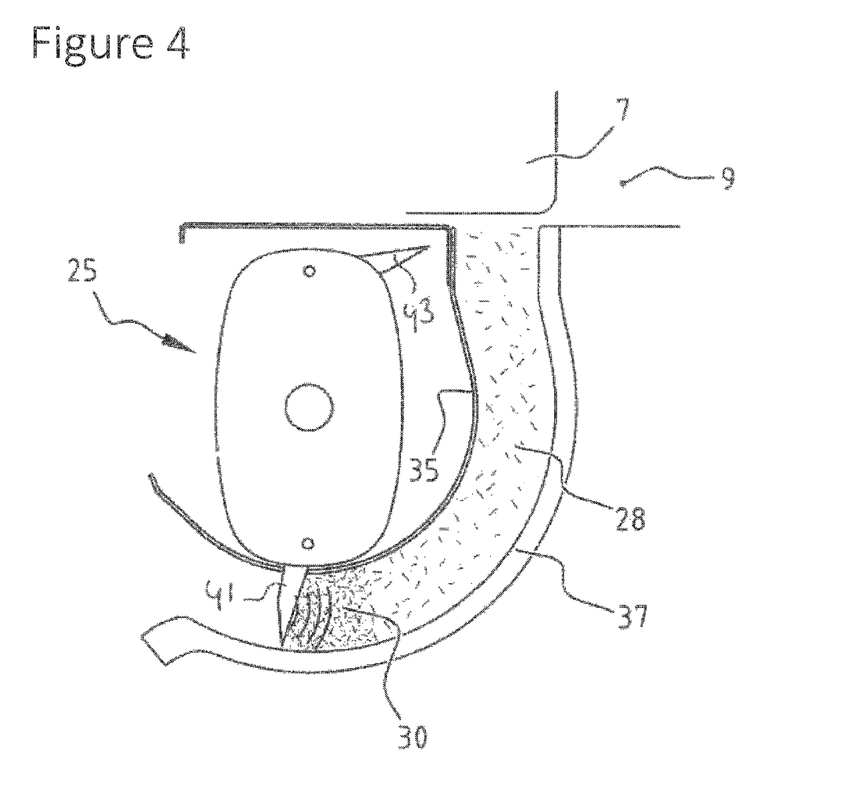
FIG. 4 shows a situation wherein during accumulation of the charge of crop material, a plug of crop material gets stuck in the feeder duct.

FIG. 4 shows a situation wherein, during accumulation of the charge of crop material 28, a plug 30 of crop material gets stuck in the feeder duct 23 between the top wall 35 and bottom wall 37, causing the feeding means 25 to become inoperable.

Figure 5:
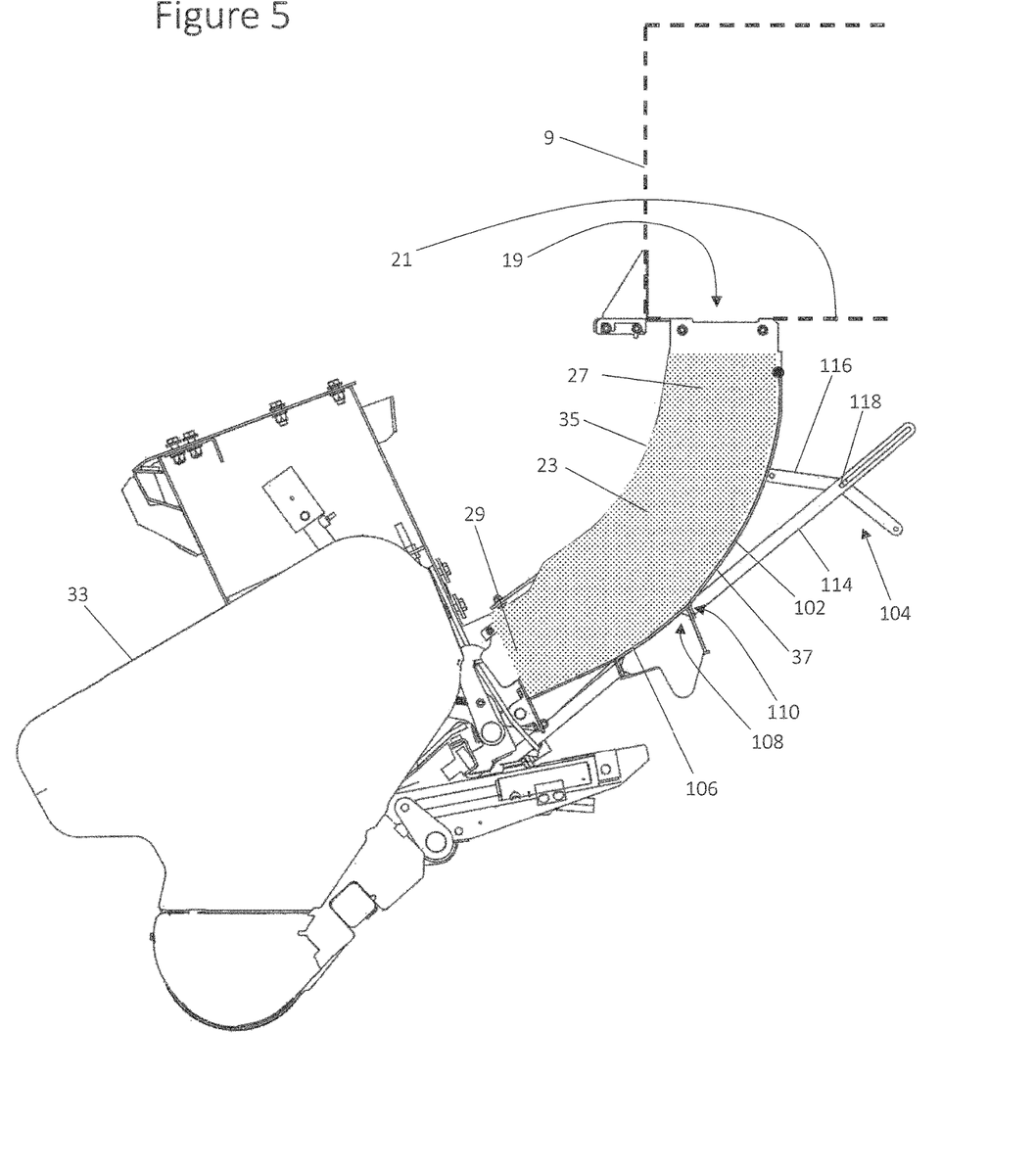
FIG. 5 shows part of an example embodiment of an agricultural baler, such as the baler illustrated in FIG. 1.

FIG. 5 shows part of an example embodiment of an agricultural baler, such as the baler illustrated in FIG. 1, for which a plug of crop material can be removed, and the baler can be conveniently reconfigured to continue baling.

FIG. 5 shows a bale chamber 9, a feeder duct 23, and a pick-up device 33. The bale chamber 9 has a bottom wall 21 in which an inlet opening 19 is formed. As discussed above, the feeder duct 23 is in communication with the bale chamber 9 through the inlet opening 19 such that charges of crop material can be transferred from the feeder duct 23 into the bale chamber 9.

Figure 6:
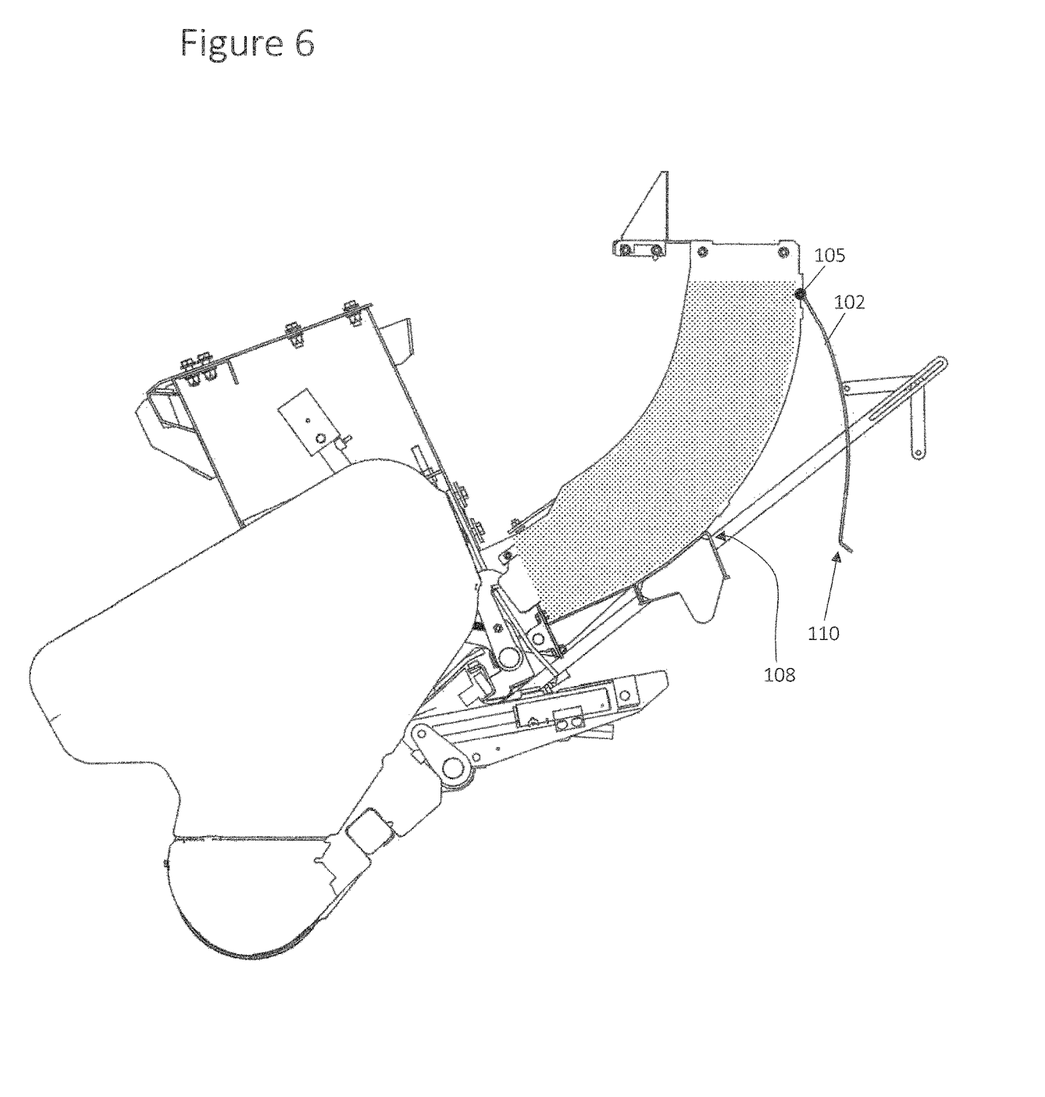
FIG. 6 shows the components of FIG. 5, in which the door has been moved to its door-open-position.

The feeder duct 23 has an upper end 27 facing generally upwardly and communicating with the inlet opening 19 in the bale chamber 9, and also has a lower end 29 facing generally in a forward direction for receiving crop material from the pick-up device 33. The feeder duct 23 has a top wall 35 and a bottom wall 37 extending between the lower end 29 and the upper end 27 of the feeder duct 23. In this example a door 102 defines at least a portion of the bottom wall 37 of the feeder duct 23. The door 102 is movable between: (i) a door-closed-position (as shown in FIG. 5) in which the opening is closed; and (ii) a door-open-position (as shown in FIG. 6, as will be described below), in which an opening in the bottom wall (37) is provided. The door 102 is in the door-closed-position during normal use such that the feeder duct 23 can communicate the crop material to the bale chamber 9. If a blockage in the feeder duct 23 occurs (as shown in FIG. 4), then the baler can be stopped and the door 102 can be moved to the door-open-position. An operator can then manually remove the blockage and clean out the feeder duct 23. The door 102 can also be referred to as a drop floor. In some examples, the baler can be manually stopped by an operator. In other examples, the baler can be automatically stopped in response to a controller detecting a blockage. Similarly, the door 102 can be opened manually or automatically. For instance, the door 102 can swing open automatically when a blockage is detected.

Figure 9:
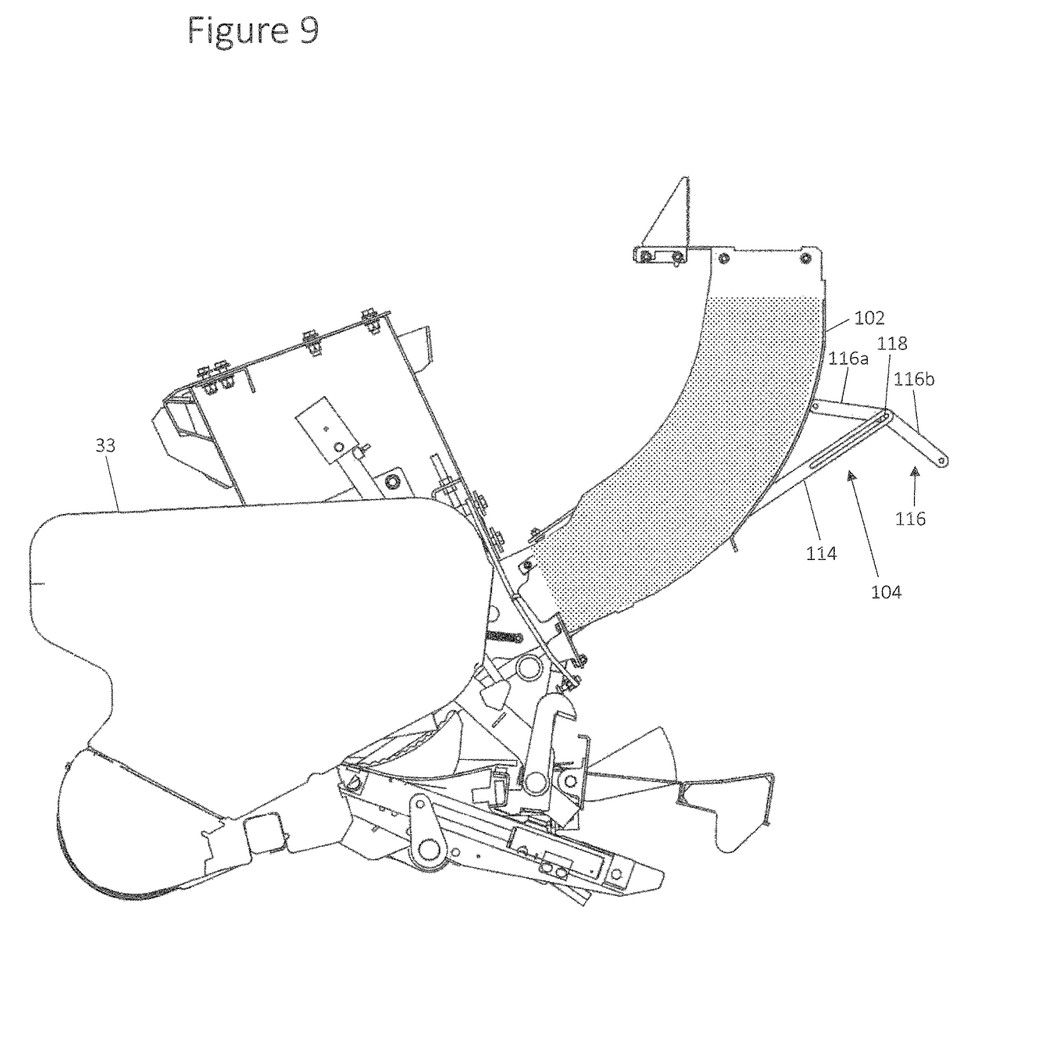
FIG. 9 shows the components of FIG. 5, in which the pick-up device has been moved completely to its raised-position.

The pick-up device 33 is movable between: (i) a first-position; and (ii) a second-position. The first-position is a lowered-position (as shown in FIG. 5) in which it is adjacent the ground and is operable to convey crop material into the lower end 29 of the feeder duct 23. The second-position is a raised-position (as shown in FIG. 9, as will be described below) in which it is spaced further away from the ground than in the lowered-position. The pick-up device 33 can be located in the lowered-position when it is in use in a field. The pick-up device 33 can be located in the raised-position when it is in transit between fields, such as when it is driving on a road, or otherwise when it is not required to pick up crop material. As will be discussed below, the pick-up device 33 is an example of an operational component that can be moved by an actuator (in this example a pick-up-actuator), such that the same actuator can also be used to close the door 102.

As will be described in detail below, in this example, the pick-up device 33 is mechanically coupled to the door 102 of the bottom wall 37, such that movement of the pick-up device 33 between the lowered-position and the raised-position causes the door 102 to move from the door-open-position to the door-closed-position. In this example a linkage mechanism 104 is used to couple the pick-up device 33 to the door 102.

The linkage mechanism 104 in FIG. 5 includes a first slotted-linkage-member 114, and a second linkage-member 116. The first slotted-linkage-member 114 is fixed at one end to the pick-device 33, and has a slot at the other end. The second linkage-member 116 is a hinged link-member that is fixed at one end to the door 102. In this example, the other end of the second linkage-member 116 is fixed to a housing of the baler (not shown) such that it remains static during use. The second linkage-member 116 also includes a linkage-pin 118 that can move freely along the slot of the first slotted-linkage-member 114. As will be described in more detail below, the linkage mechanism 104 does not impede movement of the door 102 from the door-closed-position to the door-open-position when the pick-up device 33 is in the lowered-position, and the linkage mechanism 104 causes the door 102 to move from the door-open-position to the door-closed-position when the position of the pick-up device 33 is changed from the lowered-position to the raised-position.

It will be appreciated that the linkage-mechanism 104 of FIG. 5 is only one example of a mechanism for coupling the pick-up device 33 to the door 102, in order to achieve the desired movements. In other examples a different linkage mechanism, a linkage cable (such as a steel cable, which may be a brake cable), or any other coupling can be used. For instance, a pulley system can be used.

Providing a mechanical coupling between the pick-up device 33 and the door 102 of the bottom wall 37 can provide an advantageous way of closing the door 102. For example, it has been found that a single person (such as the operator of the tractor/baler) can manually open the door 102 (if it is not done automatically) and remove any blockage from the feeder duct 23. However, a manual operation of closing the door 102 after the blockage has been removed may require the strength of two people. Therefore, providing an automatic mechanism for closing the door 102 is advantageous because fewer people may be required to reconfigure/reassemble the baler after a blockage has been removed, and therefore fewer people may be required to perform a baling operation and/or the baling operation can be performed more quickly.

Furthermore, if there is a blockage then the operator will empty the feeder duct 23 and then close the door 102 (by lifting the pick-up device 33). The operator may then drive the baler backwards, before lowering the pick-up device 33 again in order to pick up the removed crop material whilst driving forward and continuing baling. If the pick-up device 33 were in a lowered position when the baler is reversed, then it would push the removed crop material back in to the feeder duct 23 when the baler is moving backwards, which can be undesirable. It can therefore be advantageous that the pick-up device 33 is already raised before the baler is reversed because the pick-up device 33 will be able to pass over the removed crop material, without picking it up, when the baler is backed up. Also, this process can be considered as saving time because an additional operation (in addition to removing the blockage from the feeder duct 23) solely to raise the pick-up device 33 is not required. This process can be quicker than having to unmount an upper wall of the feeder duct 23 to remove a blockage.

As a yet further advantage, by using the pick-up device 33 to close the door 102, no additional actuators may be required. For example, the baler may include a pick-up-actuator (which may be a hydraulic actuator or an electrical actuator) that can move the pick-up device 33 between the lowered-position and the raised-position. Such an actuator may already be present on the baler, and therefore can be reused for closing the door 102. As will be discussed below, in some applications, another existing actuator (not necessarily the pick-up-actuator) can be used to close the door 102; the other actuator may be one that can provide a relatively short stroke, such as 100 mm. By using existing actuators, a low number of additional components may be required for providing the additional function of closing the door 102.

Figure 7:
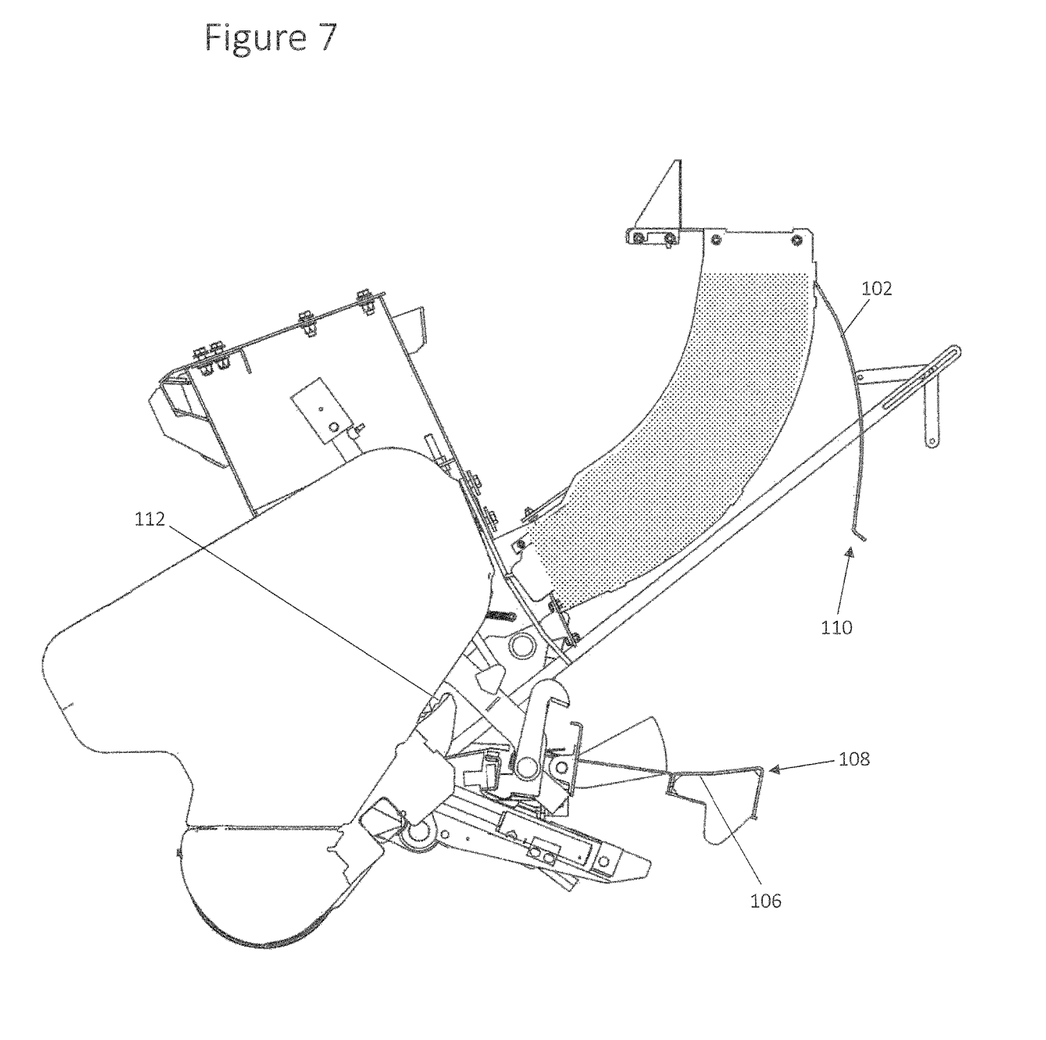
FIG. 7 shows the components of FIG. 5, in which the cutting drawer has been moved to its drawer-open-position.

In this example, the cutting unit includes a cutting drawer 106, which defines a portion of the bottom wall 37 of the feeder duct 23. The cutting drawer 106 is movable between (i) a drawer-closed-position (as shown in FIG. 5), and (ii) a drawer-open-position (as shown in FIG. 7, as will be described below). In this example, a distal edge of the door 102 is adjacent to a distal edge of the cutting drawer 106 when they are both closed. That is, the cutting drawer 106 has a cutting-drawer-edge 108, and the door 102 has a door-edge 110. When the cutting drawer 106 is in the drawer-closed-position, the cutting-drawer-edge 108 is adjacent to the door-edge 110, when the door 102 is in the door-closed-position. When the cutting drawer 106 is in the drawer-open-position, the cutting-drawer-edge 108 is spaced apart from the door edge 110.

The feeder duct 23 can be said to define an in-use-duct volume (that is shaded in FIG. 5), which defines a volume of the feeder duct 23 that receives crop material when the baler is in use in a field. When the door 102 and the cutting drawer 106 are in their closed positions, they define a bottom-wall-surface that defines the periphery of the in-use-duct volume. When the door 102 is open, its door edge 110 is spaced apart from the bottom-wall-surface. Similarly, when the cutting drawer 106 is open, its cutting-drawer-edge 108 is spaced apart from the bottom-wall-surface.

FIGS. 6, 7, 8, 9 and 10 illustrate an example of how the components of FIG. 5 can be moved in sequence in order to remove a blockage form the feeder duct 23, and then reconfigure the baler for further operation. The same reference numbers are used throughout these figures to identify corresponding features.

In FIG. 6, the door 102 has been moved to its door-open-position, such that its door-edge 110 is spaced apart from the cutting-drawer-edge 108. The door-edge 110 is also spaced apart from the outer surface area of the volume of the feeder duct 23 that receives crop material when the baler is in use. In this example, the door 102 is rotatable about a door-pivot-axis 105, such that it is movable between the door-closed-position (shown in FIG. 5) and the door-open-position (shown in FIG. 6). As indicated above, when the door 102 is in the door-open-position, an operator can access the feeder duct 23 in order to remove any blockages.

In FIG. 7, the cutting drawer 106 has been moved to its drawer-open-position. The door 102 is also still in its door-open-position. When the cutting drawer 106 is in its drawer-open-position, the cutting-drawer-edge 108 is spaced apart from the outer surface area of the volume of the feeder duct 23 that receives crop material when the baler is in use. The cutting-drawer-edge 108 can be spaced apart from the door-edge 110, irrespective of whether the door 102 is in the door-open- or door-closed-position. In this example, the cutting drawer 106 is, together with the door 102, in their opened positions, and the cutting drawer 106 is rotatable about a cutting-drawer-pivot-axis (not visible in FIG. 7), such that it is movable between the drawer-closed-position (shown in FIG. 5) and the drawer-open-position (shown in FIG. 7).

As shown in FIG. 7, the inner surface of the cutting drawer 106 in this example includes knives 112. For this reason, the cutting drawer 106 can also be referred to as a knife drawer. When the cutting drawer 106 is in the drawer-closed-position, the knives 112 can be suitably aligned with another component of the cutting unit, for example a cutting drum, such that the crop material is cut by the knives 112 when it enters the feeder duct 23.

In some examples, it can be advantageous for the cutting drawer 106 to be openable to increase the size of an opening that an operator can use to access the feeder duct 23 to clear any blockages which are located closer to the cutting unit 31 or pickup device 33. Also, the region of the feeder duct 23 that is above the cutting drawer 106 can be the narrowest region of the feeder duct 23, and thus most likely to become blocked. Therefore, providing an openable cutting drawer 106 can be advantageous because it can provide direct access to a region of the feeder duct 23 that can be most likely to become blocked in some applications.

In other examples, the baler may have a packer unit instead of a cutting unit. When a packer unit is used, the cutting drawer 106 described above may be replaced by a plate/drawer that does not have any knives. The cutting drawer 106 (when a cutting unit is used) and the plate/drawer (when a packer unit is used) can be considered as examples of bottom drawers, which both have a bottom-drawer-edge. Such a bottom drawer can be rotatable about a bottom-drawer-pivot-axis such that it is movable between the drawer-closed-position and the drawer-open-position.

Figure 8:
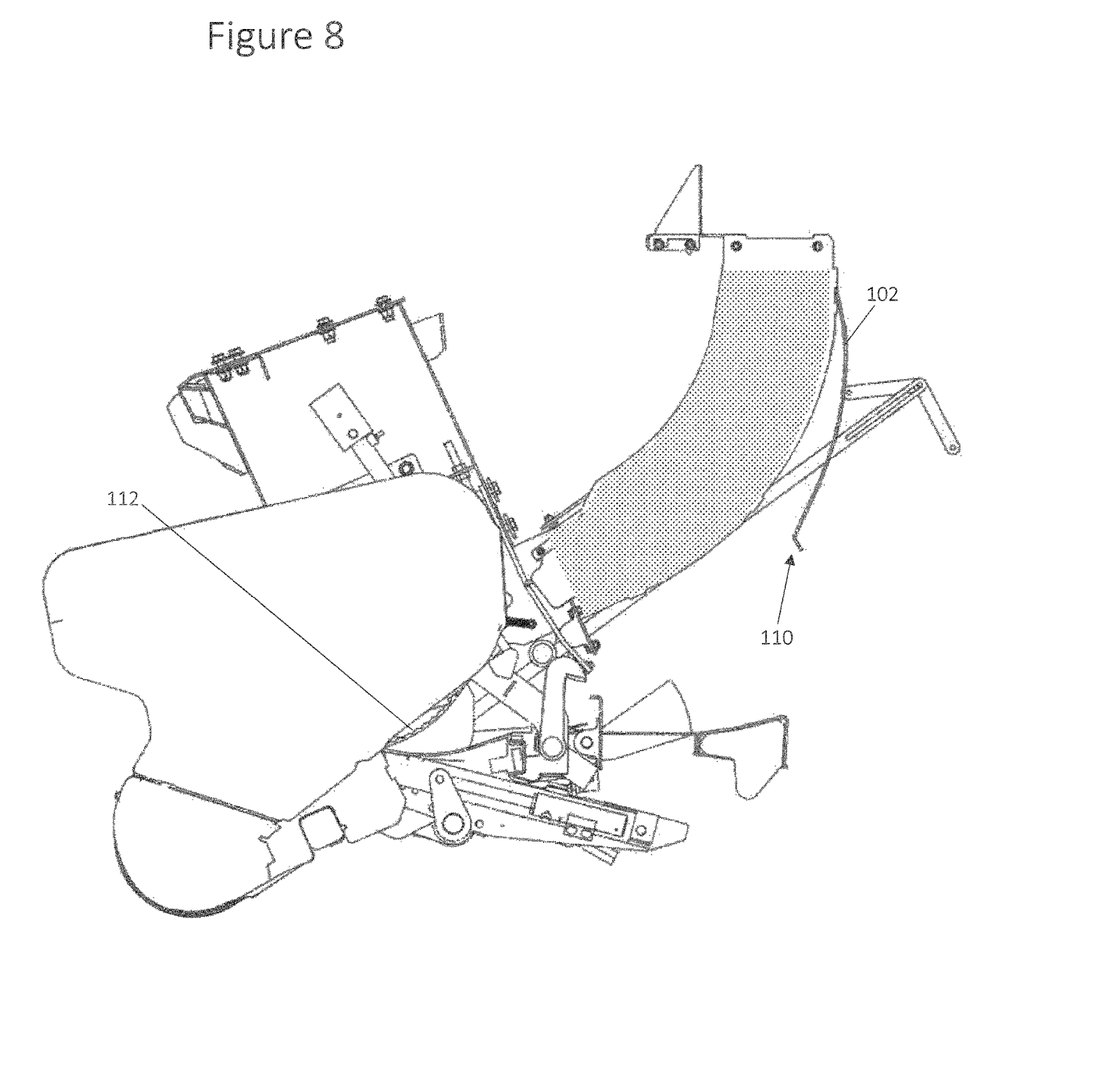
FIG. 8 shows the components of FIG. 5, in which the pick-up device has been moved from its lowered-position partially towards its raised-position.

In FIG. 8, the pick-up device 33 has been moved from its lowered-position (as shown in FIGS. 6 and 7) partially towards its raised-position (the fully raised-position is shown in FIG. 9). As the pick-up device 33 is raised, the first slotted-linkage-member 114, which is fixed to the pick-up 33, moves. The first slotted-linkage-member 114 is moved such that the pin 118 on the second linkage-member 116 reaches a closed end of the slot in the first slotted-linkage-member 114, and the further movement of the first slotted-linkage-member 114 applies a force to the pin 118. The linkage mechanism 104 is configured such that the force applied to the pin 118 causes the door 102 to move towards its closed position. It is recalled that the pin 118 is fixed to the second linkage-member 116, and the second linkage-member 116 is fixed to the door 102.

In FIG. 9, the pick-up device 33 has been moved completely to its raised-position. The first slotted-linkage-member 114 has been moved such that the pin 118 has exerted a force on the second linkage-member 116 and the door 102 is completely closed.

The second linkage-member 116 in this example includes a door-attached-member 116a and a housing-attached-member 116b, which are hingedly connected by the linkage-pin 118. The door-attached-member 116a is fixed to the door 102. The housing-attached-member 116b is fixed to a housing of the baler (not shown) such that it remains static during use. The lengths of the door-attached-member 116a and the housing-attached-member 116b can be set in accordance the placement of the linkage mechanism and force balance on the mechanism. For instance, the door-attached-member 116a can be longer or shorter than the housing-attached-member 116b.

In this example, the pick-up device 33 is rotatable about a pick-up-pivot-axis (not shown) such that it is movable between the lowered-position and the raised-position.

As discussed above, it can be advantageous to use the pick-up device 33 to close the door 102, rather than an operator (or operators) manually trying to close the door 102. It will be appreciated that in other examples, the linkage mechanism 104 can be configured such that movement of the pick-up device 33 from the raised-position to the lowered-position can be used to close the door 102. For instance, the door-attached-member 116a and the housing-attached-member 116b may be connected together such that they point away from the distal end of the first slotted-linkage-member 114. In this way, the other end of the slot in the first slotted-linkage-member 114 exerts a force on the pin 118 to close the door 102.

In some examples, the door 102 can include a latch mechanism (not shown) for retaining the door 102 in the door-closed-position. The latch mechanism can be automatically lockable to retain the door 102 in the door-closed-position when it is moved from the door-open-position to the door-closed-position. Optionally, the latch mechanism is manually releasable to permit movement of the door 102 from the door-closed-position to the door-open-position. For instance, a spring loaded latch/lock can be used to provide automatic locking when the door 102 is closed. In some examples, the latch mechanism can be automatically releasable to permit movement of the door 102 from the door-closed-position to the door-open-position.

Figure 10:
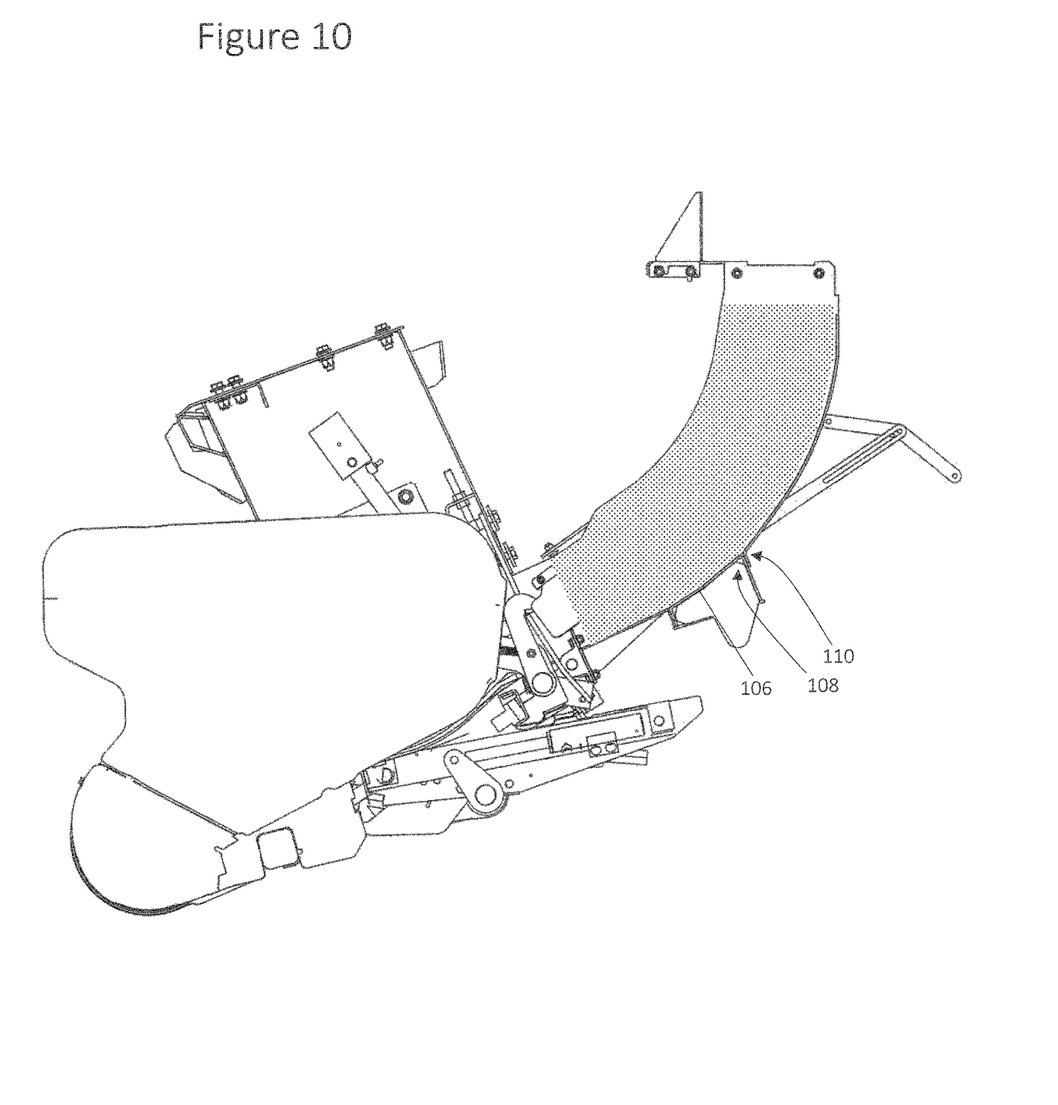
FIG. 10 shows the components of FIG. 5, in which the cutting drawer has been moved to its drawer-closed-position.

In FIG. 10, the cutting drawer 106 has been moved to its drawer-closed-position, such that its cutting-drawer-edge 108 is adjacent to the door-edge 110 of the door 102 (which is in the door-closed-position). In this example, the cutting-drawer is manually closable by an operator. In other examples, the cutting drawer 106 can be closed by hydraulics that are operated by a user. The controls for the hydraulics can be located in the cab of a tractor and/or from controls at the rear of the tractor, for example).

In some examples, the cutting drawer 106 can extend along at least 20%, 30% or 40% of the length of the bottom wall 37. Also, the door 102 can extend along less than 80%, 70% or 60% of the length of the bottom wall 37. In some applications, the cutting drawer 106 may be at least 200 mm, 300 mm or 400 mm long, and/or the door 102 may have a length that is less than 800 mm, 700 mm or 600 mm. By having a cutting drawer 106 and/or a door 102 with such dimensions, advantageously the door 102/cutting drawer 106 can be conveniently opened far enough for the blockage to be easily removed. If the door 102 is too long, then in some examples there may not be much ground clearance, which can make cleaning and removing of plugs from the feeder duct 23 more difficult. Also, if the door 102 is too long, then the door 102 could be bent if the operator drives with the door 102 in the door-open-position. By shortening the door 102, more ground clearance can be provided, and the cutting drawer 106 can be opened to increase the access to the feeder duct 23 to remove blockages.

In some examples, the door-pivot-axis (which is shown with reference number 105 in FIG. 6) may be spaced apart from an end of the feeder duct 23. For instance, it may be spaced apart from an end of the feeder duct 23 (which may be the end of the feeder duct 23 that is in communication with the inlet opening 19 of the bale chamber) by at least 20%, 40% or 50% of the length of the bottom wall 37. The door 102 may define a portion of the bottom wall 37 that extends from the door-pivot-axis in a direction that is away from the inlet opening 19. In such examples, it may be sufficient for an operator to only be able to access a lower region of the feeder duct 23 when the door 102 is open. This may be especially relevant for machines that have a packer unit instead of a cutting unit.

As indicated above, in other examples an "other actuator", that is not necessarily the pick-up-actuator, can be used to move from the door-open-position to the door-closed-position.

Figure 11:
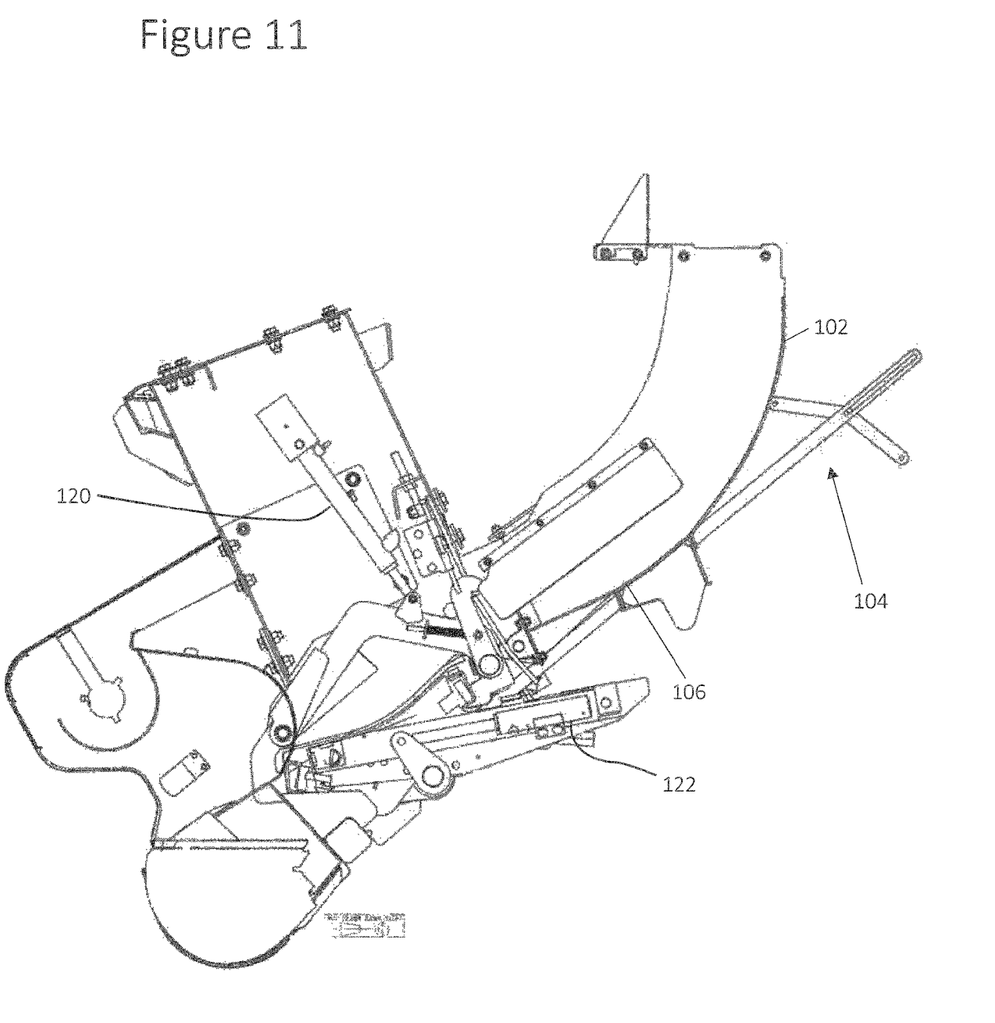
FIG. 11 shows part of another example embodiment of an agricultural baler.

FIG. 11 shows part of another example embodiment of an agricultural baler, for which a plug of crop material can be conveniently removed. FIG. 11 shows two further examples of actuators that can be mechanically coupled (directly or indirectly) to the door 102 to move it from the door-open-position to the door-closed-position. The actuators that are shown in FIG. 11 are: i) a bottom-drawer-movement-actuator 120; and a knife-movement-actuator 122. Although not shown in FIG. 11, a mechanical coupling can be used to provide a coupling between the door 102 and: the bottom-drawer-movement-actuator 120; or the knife-movement-actuator 122. Such a mechanical coupling can be similar to the linkage mechanism 104 that is indirectly coupled to the pick-up-actuator.

The bottom-drawer-movement-actuator 120 can move the bottom-drawer (which in this example is a cutting drawer 106) between: (i) a first-position; and (ii) a second-position. The first-position is the drawer-closed-position (shown in FIG. 5), in which the bottom-drawer-edge is adjacent to the door-edge when the door is in the door-closed-position. The second-position is the drawer-open-position (shown in FIG. 7), in which the bottom-drawer-edge is spaced apart from the door-edge when the door is in the door-closed-position.

The bottom-drawer-movement-actuator 120 can be mechanically coupled to the door 102 (such a coupling is not shown in FIG. 11). The bottom-drawer-movement-actuator 120 can be directly coupled to the door 102. Alternatively, the bottom-drawer-movement-actuator 120 can be indirectly coupled to the door 102; for instance, both the bottom-drawer-movement-actuator 120 and the door 102 can be mechanically coupled to the cutting drawer 106. In this way, the bottom-drawer-movement-actuator 120 can be activated to move the cutting drawer 106, and the door 102 can be automatically closed at the same time.

In this way, the cutting drawer 106 is an example of an operational component that can be moved by an actuator 120, such that the same actuator 120 can also be used to close the door 102.

The knife-movement-actuator 122 can move the knives 112 between: (i) a first-position; and (ii) a second-position. The first-position is a knives-exposed-position, in which the knives 112 are suitably aligned with another component of the cutting unit such that crop material is cut by the knives 112 when it enters the feeder duct 23. The second-position is a knives-retracted-position, in which the knives 112 are spaced apart from the other component of the cutting unit such that crop material is not cut by the knives 112 when it enters the feeder duct 23.

The knife-movement-actuator 122 can be mechanically coupled to the door 102 (such a coupling is not shown in FIG. 11). The knife-movement-actuator 122 can be directly coupled to the door 102. Alternatively, the knife-movement-actuator 122 can be indirectly coupled to the door 102; for instance, both the knife-movement-actuator 122 and the door 102 can be mechanically coupled to the knives 112. In this way, the knife-movement-actuator 122 can be activated to expose or retract the knives 112, and the door 102 can be automatically closed at the same time.

In this way, the knives 112 are an example of an operational component that can be moved by an actuator 122, such that the same actuator 122 can also be used to close the door 102.

In some examples, there may be a plurality of actuators. For instance there may be two bottom-drawer-movement-actuators 120; one on each end of the cutting drawer 106. Similarly, there may be a plurality of mechanical couplings for each actuator/operational component.

Figure 12:
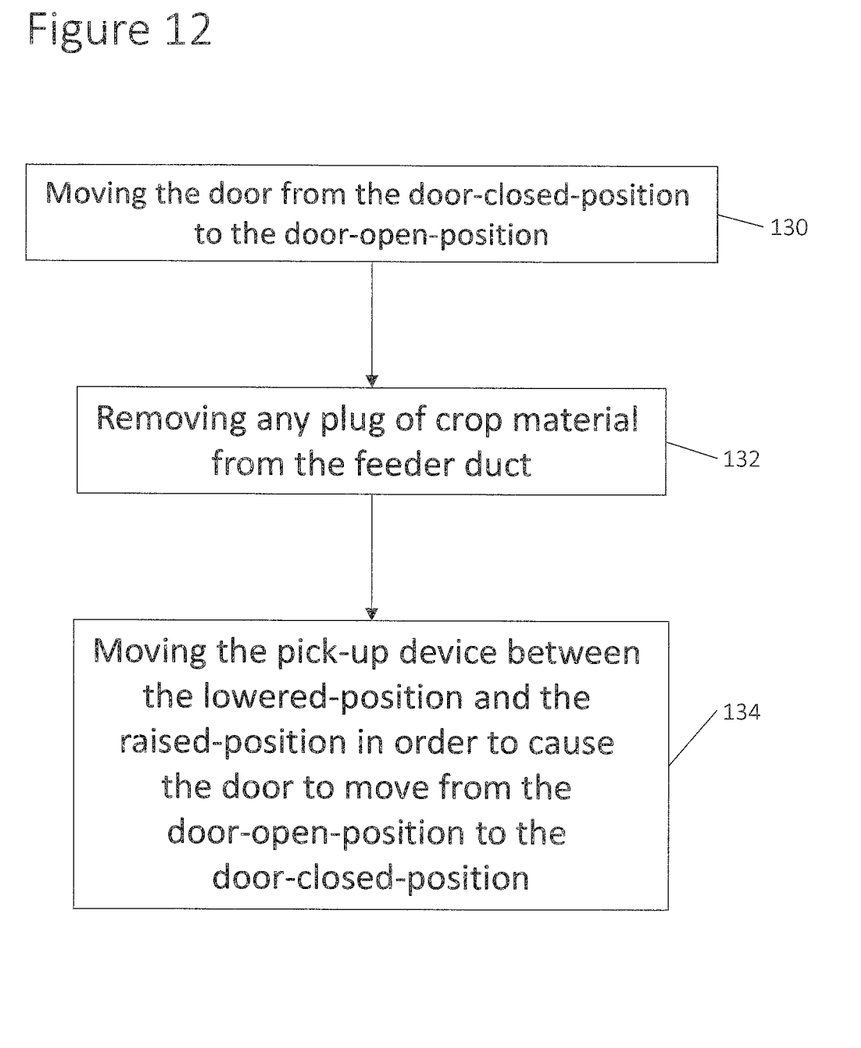
FIG. 12 shows schematically an example of a method for accessing a feeder duct of an agricultural baler.

FIG. 12 shows schematically an example of a method for accessing a feeder duct of an agricultural baler, such as a baler including one or more of the features described above.

At step 130, the method includes moving the door from the door-closed-position to the door-open-position. As discussed above, the door may be opened to enable an operator to remove a blockage on the feeder duct, for example. In some examples, the method may also include the step (not shown in FIG. 12) of opening a cutting drawer to increase the operator's access to the feeder duct. Either or both of the door and the cutting drawer can be opened automatically or manually. For instance, an actuator can be used to automatically open the door and/or the cutting drawer.

At step 132, the method includes the step of removing any plug of crop material from the feeder duct.

As step 134, the method includes the step of moving the pick-up device between the lowered-position and the raised-position (either from the lowered-position to the raised-position, or from the raised-position to the lowered-position) in order to cause the door to move automatically from the door-open-position to the door-closed-position. For instance, the operator can remove any blockage, clean out the feeder duct, and then get back in his seat to move the pick-up device 33 up to close the door 102 and/or the cutting drawer 106, and then back down to re-start baling again. As discussed above, this can provide a convenient way of closing the door such that baling can continue. In some applications, closing the door in this way can enable a blockage to be removed, and the baler reconfigured to continue baling, by a single operator. For example, the door 102 (drop floor) can advantageously be closed within 30 seconds by 1 person.

The invention claimed is:

1. An agricultural baler comprising:
    a bale chamber having a bottom wall in which an inlet opening is formed;
    a feeder duct communicating with the bale chamber through the inlet opening for charges of crop material to be transferred from the feeder duct into the bale chamber, the feeder duct having an upper end facing generally upwardly and communicating with the inlet opening in the bale chamber and a lower end facing generally in a forward direction, the feeder duct further having a top wall and a bottom wall extending between the lower end and the upper end of the feeder duct;
    a door that defines at least a portion of the bottom wall of the feeder duct, the door being movable between: (i) a door-open-position, in which an opening in the bottom wall is provided; and (ii) a door-closed-position in which the opening is closed; and
    an actuator configured to move an operational component of the baler between: (i) a first-position; and (ii) a second-position,
    wherein the actuator is mechanically coupled to the door of the bottom wall of the feeder duct such that movement of the operational component between the first-position and the second-position causes the door to move from the door-open-position to the door-closed-position, the operational component is a pick-up device that is movable between: (i) a lowered-position in which the pick-up device is adjacent the ground to thereby convey crop material into the lower end of the feeder duct; and (ii) a raised-position in which the pick-up device is spaced further away from the ground than in the lowered-position, and
    wherein the pick-up device is mechanically coupled to the door of the bottom wall without impeding the door from moving from the door-closed-position to the door-open-position when the pick-up device is in the lowered-position such that movement of the pick-up device between the lowered-position and the raised-position causes the door to move from the door-open-position to the door-closed-position.

2. The agricultural baler of claim 1, wherein the actuator comprises a hydraulic actuator or an electrical actuator.

3. The agricultural baler of claim 1, wherein the pick-up device is rotatable about a pick-up-pivot-axis such that it is movable between the lowered-position and the raised-position.

4. The agricultural baler of claim 1, wherein the door is configured to be retained in the door-closed-position.

5. The agricultural baler of claim 4, wherein the door is configured to be automatically lockable to thereby retain the door in the door-closed-position when it is moved from the door-open-position to the door-closed-position.

6. The agricultural baler of claim 4, wherein the door is configured to be manually releasable to permit movement of the door from the door-closed-position to the door-open-position.

7. The agricultural baler of claim 1, wherein the actuator is mechanically coupled to the door of the bottom wall by a linkage mechanism, the linkage mechanism including at least one slotted linkage member that does not impede the door from moving from the door-closed-position to the door-open-position.

8. The agricultural baler of claim 1, wherein the actuator is mechanically coupled to the door of the bottom wall by a linkage cable.

9. The agricultural baler of claim 1, wherein the door is rotatable about a door-pivot-axis such that it is movable between the door-closed-position and the door-open-position.

10. The agricultural baler of claim 1, wherein the door of the bottom wall of the feeder duct comprises a door-edge, and wherein the baler further comprises:
    a bottom drawer that defines a portion of the bottom wall of the feeder duct, the bottom drawer comprising a bottom-drawer-edge, the bottom drawer being movable between (i) a drawer-closed-position, in which the bottom-drawer-edge is adjacent the door-edge when the door is in the door-closed-position, and (ii) a drawer-open-position, in which the bottom-draweredge is spaced apart from the door-edge when the door is in the door-closed-position.

11. The agricultural baler of claim 10, wherein the bottom drawer is rotatable such that it is movable between the drawer-closed-position and the drawer-open-position.

12. The agricultural baler of claim 10, wherein the bottom drawer extends along at least one of 20%, 30% or 40% of the length of the bottom wall.

13. The agricultural baler of claim 1, wherein the door extends along less than 80% of the length of the bottom wall.

14. The agricultural baler of claim 1, wherein the door extends along less than 70% of the length of the bottom wall.

15. The agricultural baler of claim 1, wherein the door extends along less than 60% of the length of the bottom wall.

16. A method of accessing a feeder duct of an agricultural baler, the baler comprising:
- a bale chamber having a bottom wall in which an inlet opening is formed;
- a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct;
- a door that defines at least a portion of the bottom wall of the feeder duct, wherein the door is movable between: (i) a door-open-position, in which an opening in the bottom wall is provided; and (ii) a door-closed-position in which the opening is closed; and
- an actuator that is configured to move an operational component of the baler between: (i) a first-position; and (ii) a second-position, wherein the operational component of the baler is a pick-up device that is movable between: (i) a lowered-position in which the pick-up device is adjacent the ground to thereby convey crop material into the lower end of the feeder duct; and (ii) a raised-position in which the pick-up device is spaced further away from the ground than in the lowered-position;

wherein the actuator is mechanically coupled to the door of the bottom wall of the feeder duct such that movement of the operational component between the first-position and the second-position causes the door to move from the door-open-position to the door-closed-position, the method comprising the steps of:
- moving the door from the door-closed-position to the door-open-position; and
- the actuator moving the operational component between the first-position and the second-position causing the door to move from the door-open-position to the door-closed-position as the operational component moves to the second-position, thereby closing the door, the second-position being achieved when the operational component is moved completely to a raised-position.

* * * * *